United States Patent [19]
Lamuro et al.

[11] Patent Number: 5,263,061
[45] Date of Patent: Nov. 16, 1993

[54] NUCLEAR REACTOR CONTROL ROOM CONSTRUCTION

[75] Inventors: Robert C. Lamuro; Richard Orr, both of Pittsburgh, Pa.

[73] Assignee: Westinghouse Electric Corp., Pittsburgh, Pa.

[21] Appl. No.: 903,629

[22] Filed: Jun. 24, 1992

[51] Int. Cl.⁵ .................. G21C 13/00; G21F 7/015
[52] U.S. Cl. .................... 376/260; 376/298; 165/53; 52/828
[58] Field of Search ............... 376/260, 298, 299, 293, 376/259; 976/DIG. 358, DIG. 196; 165/53; 52/828, 827; 250/515.1, 517.1

[56] References Cited

U.S. PATENT DOCUMENTS

| | | | |
|---|---|---|---|
| 4,618,002 | 10/1986 | Mears | 169/37 |
| 4,668,465 | 5/1987 | Boomgaard et al. | 376/216 |
| 4,706,424 | 11/1987 | Garapick et al. | 52/828 |
| 5,011,652 | 4/1991 | Tominaga et al. | 376/299 |

OTHER PUBLICATIONS

Patalon et al, Nuclear Engineering International, Oct. 1976, pp. 860–864.
Cox et al, "Remote Control of the LITR", ORNL-2121, Aug. 1956, p. 5.
Nuclear Engineering International—Nov. 1988 by R. Vijuk and H. Bruschi "AP600 Offers a Simpler way to greater safety, operability and maintainability", pp. 22–28.

Primary Examiner—Daniel D. Wasil
Attorney, Agent, or Firm—J. C. Valentine

[57] ABSTRACT

A control room 10 for a nuclear plant is disclosed. In the control room, objects 12, 20, 22, 26, 30 are no less than four inches from walls 10.2. A ceiling 32 contains cooling fins 35 that extend downwards toward the floor from metal plates 34. A concrete slab 33 is poured over the plates. Studs 36 are welded to the plates and are encased in the concrete.

9 Claims, 6 Drawing Sheets

NUCLEAR REACTOR CONTROL ROOM CONSTRUCTION

GOVERNMENT CONTRACT

The Government of the United States of America has rights in this invention pursuant to Contract No. DE-AC03-90SF18495 awarded by the Department of Energy.

TECHNICAL FIELD

This invention relates to nuclear plants, in particular, construction techniques for control rooms in nuclear plants.

BACKGROUND OF THE INVENTION

Designs for the control room in a nuclear plant continue to evolve based on operating experience. In particular, studies since the Three-Mile Island accident in March of 1979 have not only pointed out weaknesses in plant system designs, plant development procedures, training, maintenance and testing programs but an underestimation of the potentially critical role of operator stress during emergencies. Increasingly, the emphasis on new reactor designs centers on "passive" reactor operations, a term meaning that the plant operations are in a sense so inherently stable that they will self regulate in the absence of human control, at least for the probable time that the emergency lasts.

Seen in terms of passive operations, the evolution of nuclear reactor design techniques since the Three-Mile Island incident stress a "holistic" approach in designing a control room that minimizes operator stress. Designing portions of the control room in relative isolation to other parts of the system room is no longer considered. Rather, control room designs now should take into account the operator requirements during emergency conditions by providing a layout that is capable of sustaining personnel and equipment when power failures or reductions take place. When there is a nuclear plant operating problem, key personnel must remain on site as long as possible, in the control room. During that time, however, the normal heating and ventilating system HVAC may cease. The temperature in the control room will gradually rise from heat generated by the equipment in the control room. Even so, key personnel must remain in the control room, relatively free of the distraction of elevated room temperature.

DISCLOSURE OF THE INVENTION

An object of the present invention is to provide a control room for a nuclear plant that allows occupants to remain for a considerably long time (the likely duration of the emergency) even when the normal HVAC equipment is not operating. In particular, an object of the present invention is to provide a secure, safe nuclear power plant control room having maximum "passive" heat transfer operation, minimizing the dependency on HVAC to maintain a comfortable room temperature.

According to the invention, a total approach is taken in designing the control room. Equipment is strategically located within various compartments (rooms) within the control room. Operating equipment and furniture are not located directly against walls but at a fixed distance of the walls (e.g. four inches from walls), promoting convective cooling of the control room by maximizing the exposed surface area of concrete walls, to enhance the cooling of the room when the HVAC is off.

According to the invention, the ceiling of the control room is constructed to provide maximum heat transfer from the control room interior. The invention seizes on the fact that the room is encased by massive concrete walls capable of absorbing large quantities of energy from the room. To draw heat away from the personnel, the ceiling is composed of a concrete slab, like the walls and floors of the control room, poured over a plurality of flat metal plates. A plurality of cooling fins extends downwardly from this metal plate in the interior ceiling area of the control room. Heat is transferred from the ceiling air through these fins and the plate to the concrete slab, promoting upward airflow and also airflow between the equipment and the walls.

According to one aspect of the invention, metal rods or studs are welded to these plates and the concrete is poured over and around these studs, which provide an additional thermal connection between the concrete in the slab and the plate and thereby an additional thermal path for the cooling fins.

According to one aspect of the invention, the cooling fins may be connected to transverse metal beams located in the ceiling of the control room.

According to another aspect of the invention, a single plate extends across the ceiling and each fin extends the entire length of the plate. Studs, welded to the plate, extend into the concrete slab. The composite action of the fins, studs and concrete provide stiffness that eliminates any need for the transverse beams.

Among the features of the present invention is that it is possible to predict the heat transfer characteristics for the interior of the control room through the concrete structure (e.g. walls and ceiling) and vary the cooling fin arrangement to provide a comfortable environment for a predictable (calculable) time following loss of normal HVAC. A particular feature of the present invention is that it maximizes the passive heat transfer characteristics between the control room interior and the concrete structure reducing the rate at which the temperature rises in the interior of the control room if the normal HVAC is shut-down, e.g. in an emergency.

Other objects benefits and features of the invention will be apparent to one skilled in the art from the following description.

BEST MODE FOR CARRYING OUT THE INVENTION

Figure 1:
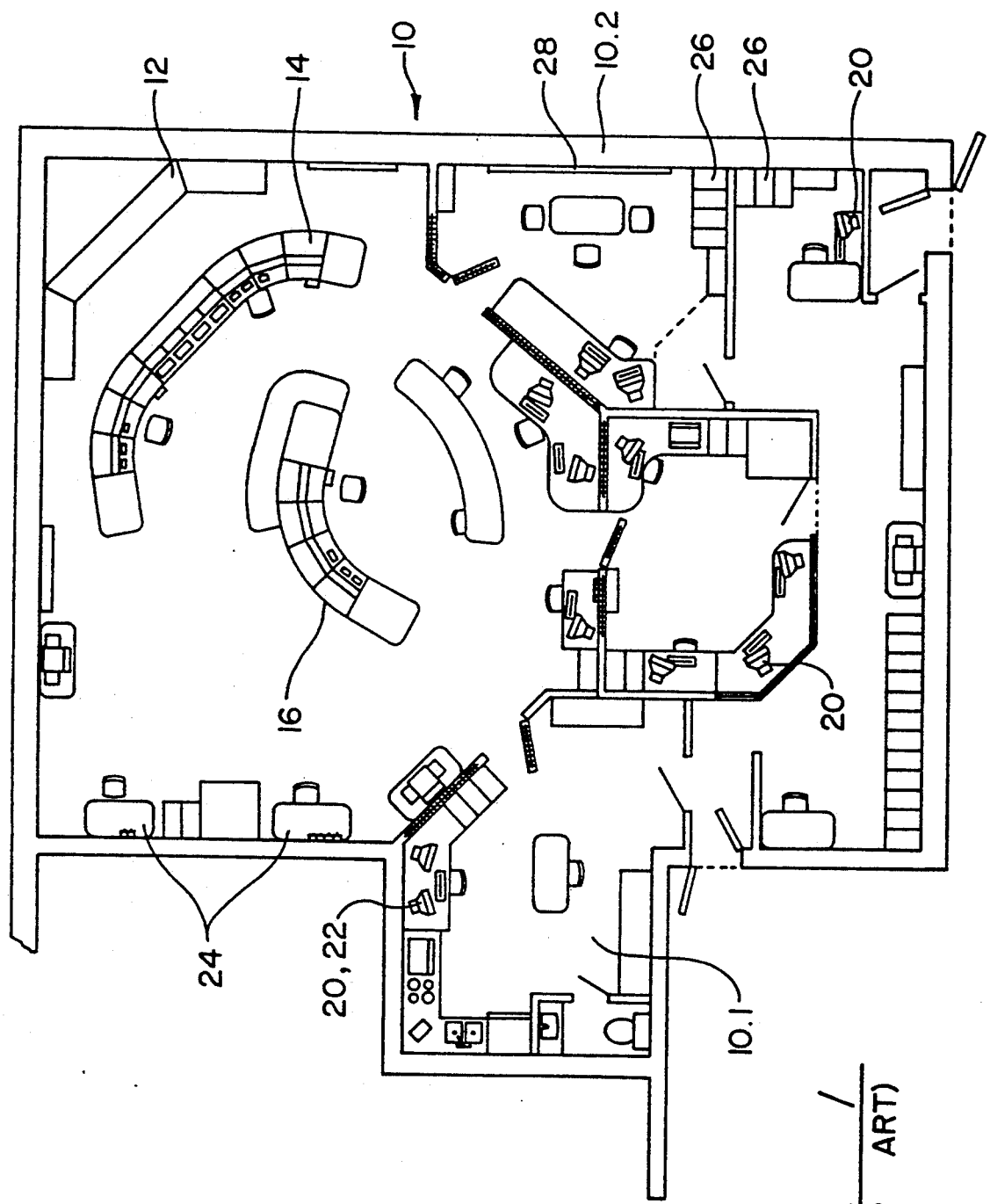
FIG. 1 is a plan (overhead) view of a prior art control room from an area immediately below the ceiling.

FIG. 1 shows a prior art nuclear plant control room 10 containing a variety of equipment and a kitchen area 10.1. The control room contains an overhead screen 12 for "mimicking" plant operations. Several feet back from the screen 12 is a dedicated control panel 14 and behind this panel is an area 16 occupied by the senior reactor operator. It should be noted in this prior art control room configuration that the equipment and furniture, such as computers and work stations, are located against the control room walls 10.2, made of thick concrete. The temperature in the room is regulated by a normal HVAC system, not shown. The equipment 12, 14 and 16, as well as computer terminals 20, generate heat. A characteristic of the prior art control room configuration or equipment layout is that it restricts the convective flow along the wall area obscured by the equipment. Even when a computer terminal 22 is off, its proximity to the wall restricts air flow to the wall immediately behind it. Cabinets 26 also are located directly against the walls producing the same heat transfer limitations. In fact, even a blackboard 28 is located flush directly against the wall, blocking off a substantial area of the wall. The panel 12 is located directly against the wall 10.2, also blocking a large area of the wall.

Figure 2:
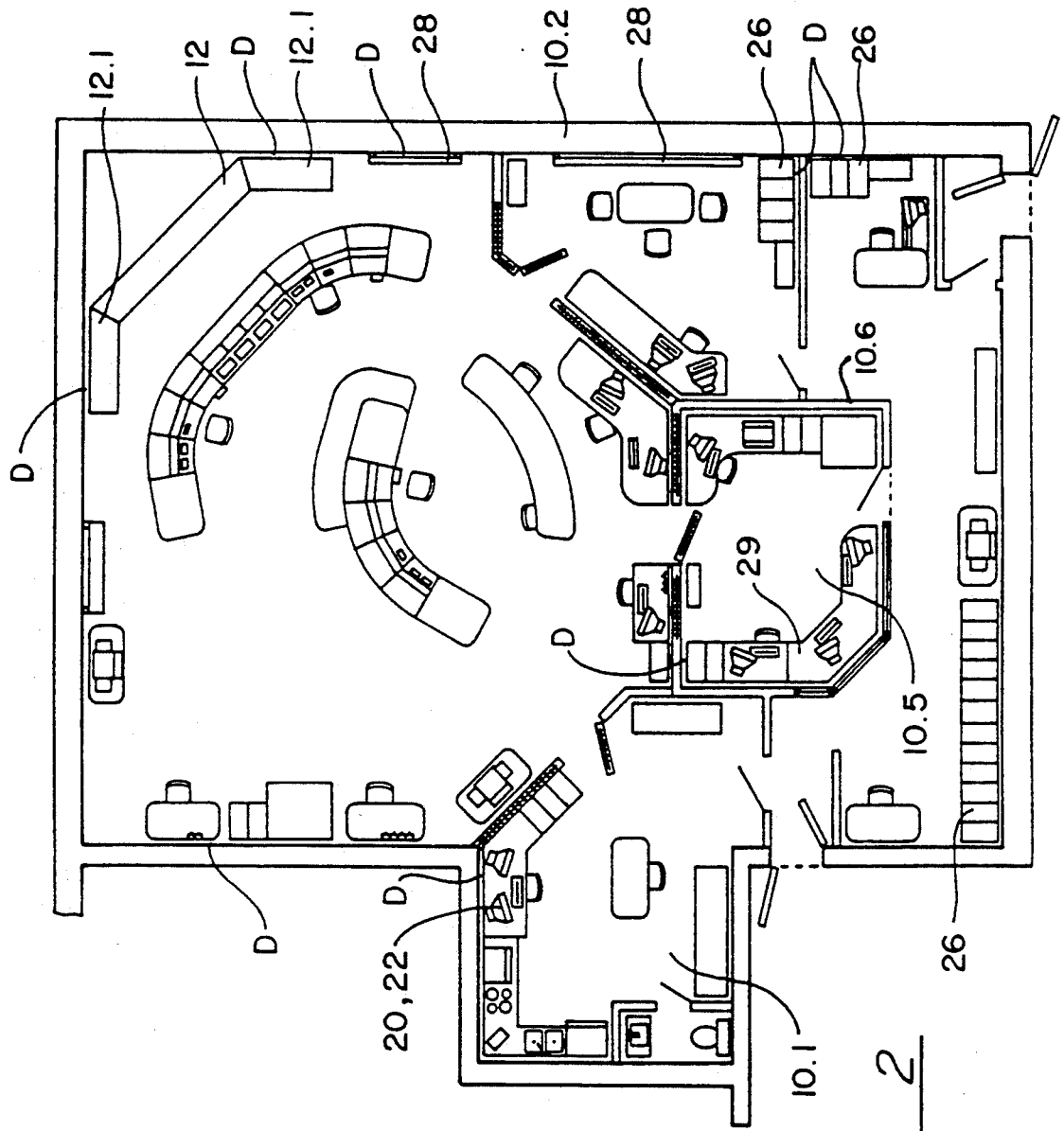
FIG. 2 is a plan (overhead) view of a control room with the equipment located according to the present invention.

On the other hand, FIG. 2 shows a control room in which the same equipment is used but is arranged according to the present invention, which maximizes heat transfer to the walls. Here, the equipment is located a certain distance D away from the wall 10.2, preferably at least four inches. Thus, the blackboard 28, for example, is located away from the wall in FIG. 2. Even the control panel 12 is located four inches away from the walls at positions 12.1. The computer terminals 20, 24 on the desks in FIG. 1 are also located at a distance away from the walls, again about four inches, promoting airflow in the area between the terminal and the wall. The file cabinets 26, against the wall in the prior art room, are also located away from the walls by distance D. Throughout the room, the equipment is no closer than four inches to the walls. In the kitchen area 10.1 all the appliances are distance D away from the walls 10.2. Even in interior room 10.5 the tables 29 are distance D from the interior walls 10.6.

Figure 3:
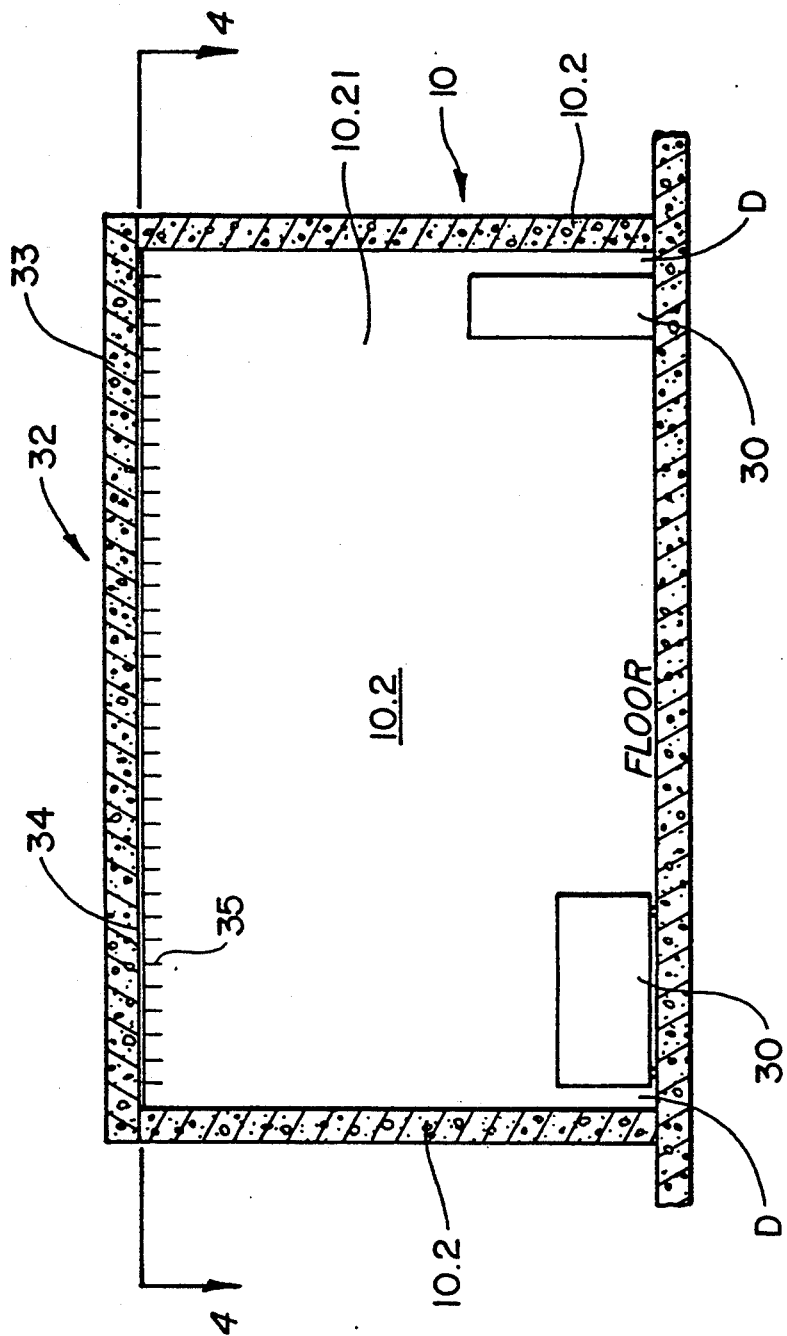
FIG. 3 is a simplified side view of a room embodying the present invention.

FIG. 3, a simplified elevation of a control room 10 with equipment 30 spaced at distance D from the walls 10.2, shows that the room 10 also contains a special ceiling 32. The ceiling contains a concrete slab 33 that is poured over metal plates 34, also shown in FIG. 4, made of structural steel. As will be explained in more detail below, the plates 34 are first individually placed in the ceiling of the room, then the concrete slab 33 is poured over the plates, which are temporarily held in place by a suitable supporting structure (e.g. timbers) until the concrete cures. The control room ceiling is supported by the composite action of the concrete slab and structural support beams or stiffened plates, as explained below.

Figure 4:
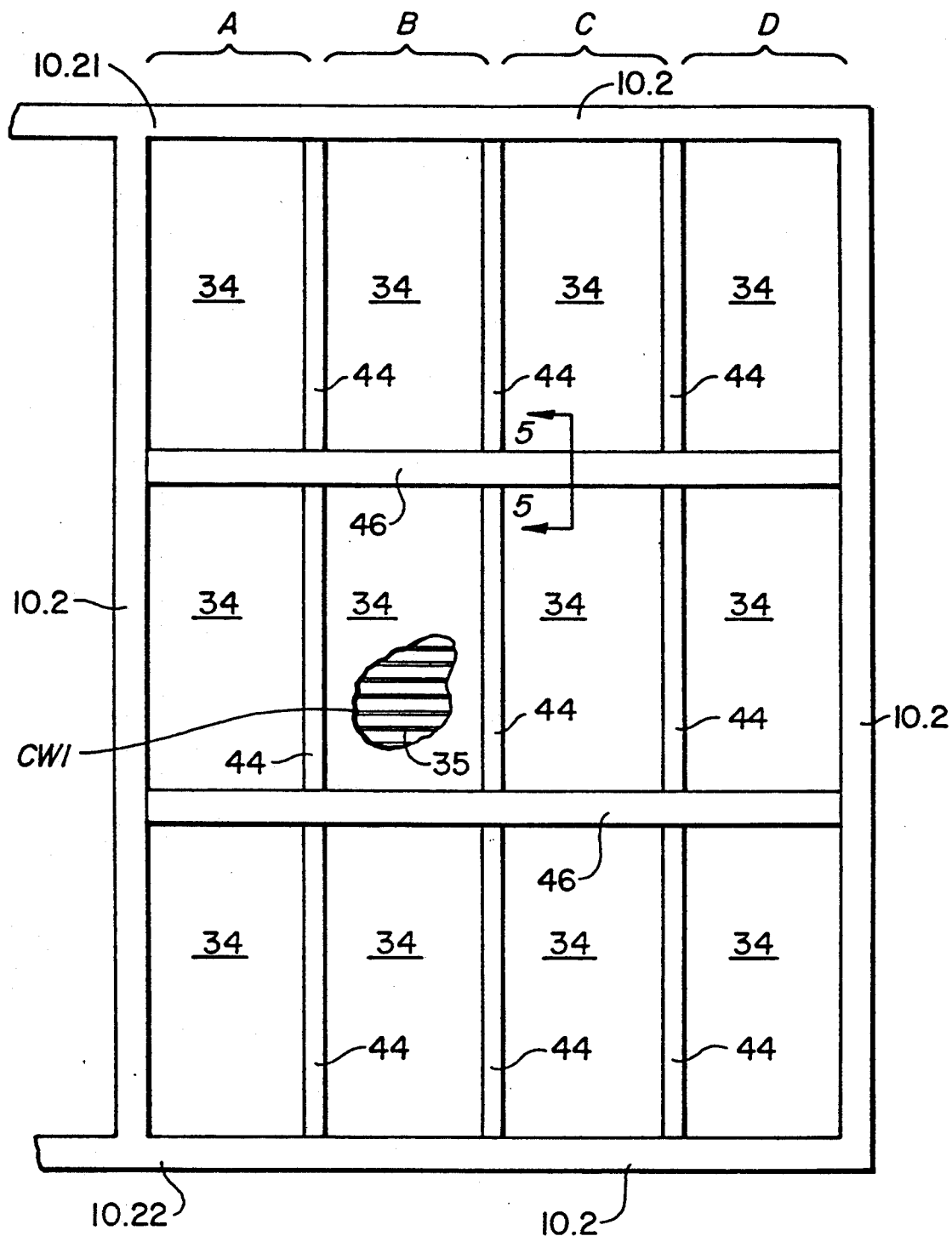
FIG. 4 is plan view of the ceiling along the line 4—4 in FIG. 3.
Figure 5:
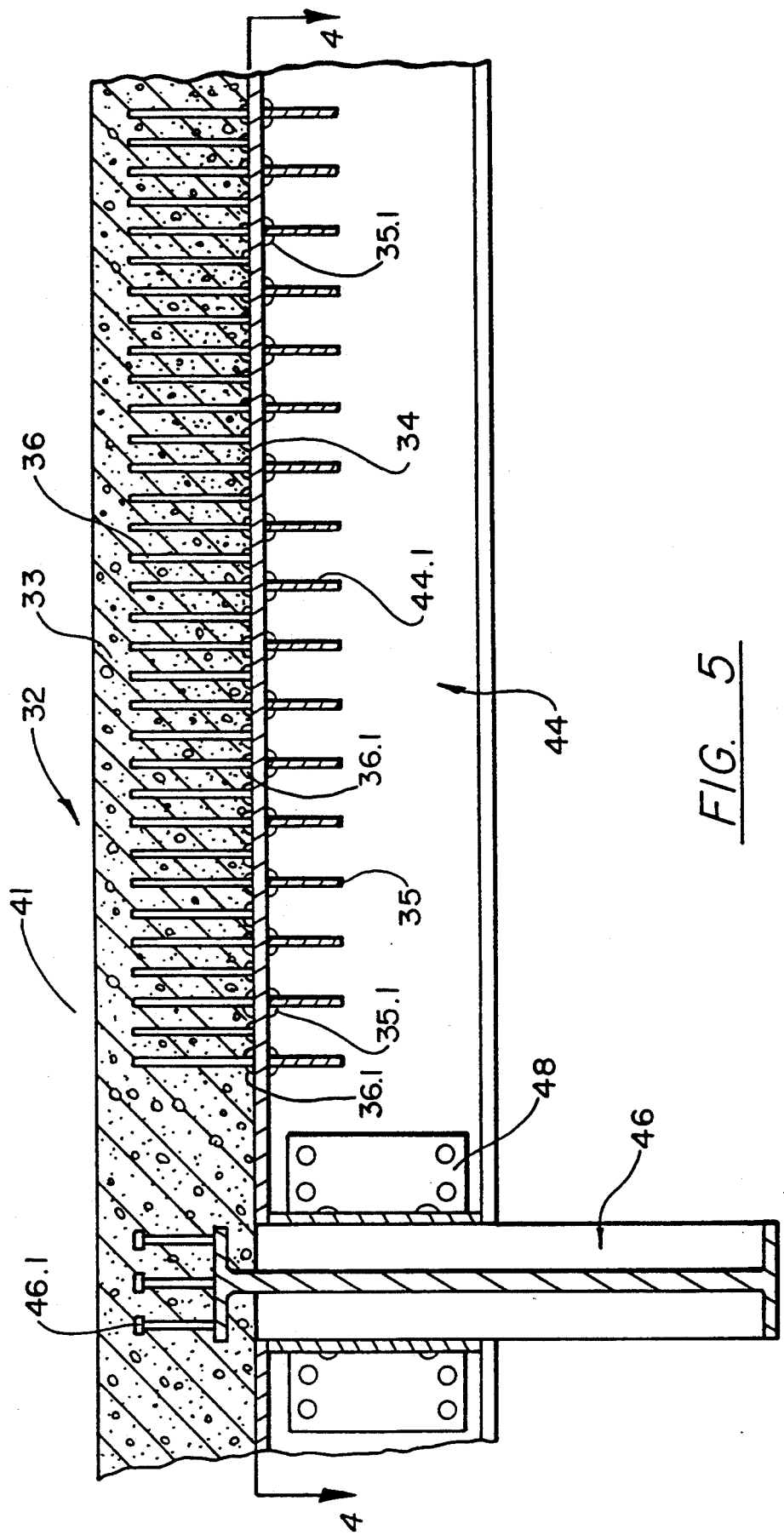
FIG. 5 is a detailed section of a wall and ceiling connection embodying the present invention.

The downwardly extending cooling fins 35 should be noted in FIG. 5. These fins are attached to the plate, preferably by welding a bead at points 35.1 along the fin length. FIG. 4 contains a cutaway CW1 that helps show that the fins 35, are immediately below the plate and extend across the ceiling area. In the preferred embodiment of the invention, the fins 35 span each plate. The fins are welded approximately nine (9) inches apart from each other. The fins which may be made of steel or a similar heat conductive material are one-half (0.5) inch thick and nine (9) inches high.

With the aid of FIG. 5, one should see that the concrete slab 33 is poured around deformed bar anchor rods 36. These are welded to the plate 34 at 36.1. The purpose of these anchors is to increase the thermal connection between the interior of the room through the plate and fins to the slab, a large dense cool object. The anchors may be six (6) inches long, nine (9) inches apart and three-quarters (0.75) inches in diameter steel.

In the embodiment of the present invention shown in FIG. 5, the plate 34 butts a beam 44 attached to a transverse beam 46 by a bracket 48. The ends of the fins may be welded (e.g. at point 44.1) to the beam 44.

By constructing a room in this manner, the rate at which the temperature will rise in the interior when the normal HVAC is terminated is reduced substantially, allowing the personnel in the room to remain to continue operating the plant.

Figure 6:
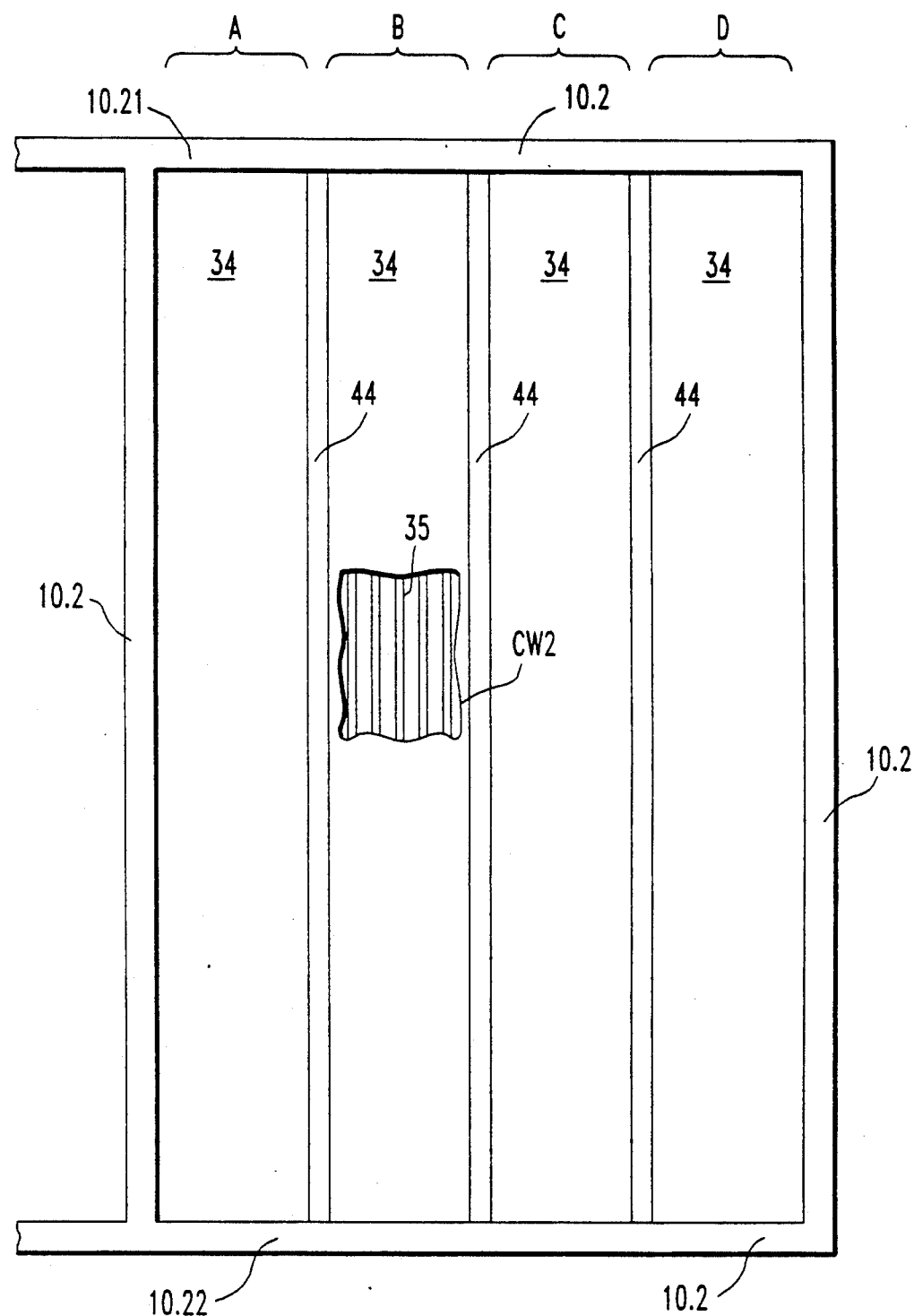
FIG. 6 is a plan view of another embodiment of a ceiling.

In an alternative embodiment, individual plates 34 in vertical rows A, B, C, D can be replaced by a single plate and the beams 46 can be removed, an arrangement effectively depicted in FIG. 6. There one plate, with the width W of a plate 34 in FIG. 4, extends between the upper and lower walls 10.21, 10.22. These larger plates form four vertical rows of plates in the ceiling. In this case, the fins 35 extend the entire length of the plate, i.e. from top to bottom in FIG. 6 (see cutaway CW2). In addition, the anchor 36 would be replaced by "shear studs". The slab 33 would be poured over the plates, as before. In this configuration, the composite action of the fins, the concrete slab with the shear studs is especially significant because it gives the ceiling enough stiffness that the beams 44 and 46 are not needed.

With the benefit of the foregoing description, one skilled in the art may find it possible to make modifications and variations to the invention in whole or in part without departing from the true scope and spirit of the invention set forth in the following claims.

We claim:

1. A method for constructing a control room containing heat producing equipment and non-heat producing equipment having concrete side walls and a concrete floor, characterized by the steps of:
   locating all control room equipment a preselected minimum distance spaced apart from the walls;
   creating a ceiling by installing metal plates across a ceiling area of the control room;
   installing cooling fins on said plates, said fins extending downward towards said floor;
   installing rods on said plates, said rods extending a first distance upward from said plates into a first area; and
   pouring a concrete slab in said first area to a depth exceeding said first distance.

2. A method according to claim 1, further characterized in that said rods are shear studs, each plate extends completely across the ceiling in a first direction and said fins extend completely across a plate in a second direction perpendicular to said first direction.

3. A method according to claim 1, further characterized in that beams extend across the ceiling area and said fins are welded at a fin edge to the beams.

4. A method of constructing a control room containing heat-producing equipment and nonheat-producing equipment for a nuclear plant having concrete side walls and a concrete floor, characterized by the steps of:
   placing all of the equipment a minimum distance spaced apart from the walls;
   providing a composite ceiling with cooling fins extending downward between the walls.

5. A method according to claim 4, further characterized by the step of:

placing rods in said composite ceiling to conduct heat away from said fins into a composite binder material.

6. A method according to claim 4, further characterized in that said ceiling comprises metal plates with poured concrete on one side of said plates and said fins on an opposite side, studs welded to said plates and extending into said slab and made of shear metal with caps embedded in said slab, each of said plates extending in a first direction completely across the ceiling between a first and second wall of the room and said fins extending in parallel completely across a plate in a second direction perpendicular to said first direction between said walls.

7. A nuclear power plant control room having concrete side walls and a concrete floor, characterized by a ceiling comprising:
   a plurality of metal plates;
   cooling fins welded to said plates, said fins extending downward for a first distance towards a floor in the control room;
   a plurality of rods welded to said plates and extending upward for a second distance from said plates; and
   a concrete slab on top of said plates and covering said rods.

8. A control room according to claim 7, further characterized by:
   said rods being shear studs and each plate extends completely across the ceiling in a first direction and said fins extend in a second direction perpendicular to the first direction across a plate.

9. A control room according to claim 7, further characterized by:
   a metal beam extending across the ceiling and supporting a first plate and ends of said fins welded to said first plate being welded to said beam.

* * * * *